(12) United States Patent
Holtslag et al.

(10) Patent No.: US 6,239,773 B1
(45) Date of Patent: May 29, 2001

(54) IMAGE DISPLAY DEVICE

(75) Inventors: Antonius H. M. Holtslag; Matheus J. G. Lammers, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/050,595

(22) Filed: Mar. 30, 1998

(30) Foreign Application Priority Data

Oct. 13, 1997 (EP) .................................................. 97203168

(51) Int. Cl.<sup>7</sup> .............................. G09G 1/14; G09G 5/10; G09G 1/28
(52) U.S. Cl. .................................. 345/20; 345/147; 345/22
(58) Field of Search .................................... 345/418, 426, 345/10, 20, 22, 147

(56) References Cited

U.S. PATENT DOCUMENTS 5,283,561 * 2/1994 Lumelsky et al. .................... 345/119

FOREIGN PATENT DOCUMENTS

| 0762753 | 3/1997 | (EP) | ................................ H04N/5/45 |
| 0 601 647 | * 12/1997 | (EP) . | |
| 0 762 753 | * 12/1997 | (EP) . | |
| WO 9617338 | 6/1996 | (WO) | ................................ G09G/5/04 |

OTHER PUBLICATIONS

"Encoding of a priori Information in Active Contour Models" in III Transactions of Pattern Analysis and Machine Intelligence, vol. 18, No. 9, Sep. 1996.

* cited by examiner

Primary Examiner—Steven Saras
Assistant Examiner—Alecia D. Nelson
(74) Attorney, Agent, or Firm—Edward W. Goodman

(57) ABSTRACT

A drive circuit for a CRT locally enhances the drive signal range in a window. Circuitry is further included for monitoring the average luminosity in the window, and the drive signal range is reduced if there is a danger of doming in the window.

9 Claims, 1 Drawing Sheet

IMAGE DISPLAY DEVICE

BACKGROUND OF THE INVENTION

1. Field of the Invention

The invention relates to an image display device comprising an input for receiving information representing an image; drive means for generating a drive signal from the information; a cathode ray tube for displaying the image driven by the drive signal; and input means coupled to the drive means for receiving further information identifying a window of pixels in the image, the drive means being arranged to change a relation between the information and the drive signal in the window as compared to a further relation between the information and the drive signal in an area outside the window, so as to enhance a drive signal range in the window.

2. Description of the Related Art

Such a device is known from PCT Patent Application No. WO 96/17338, corresponding to U.S. Pat. No. 5,638,090. This device makes it possible to show an image which contains video and text and to enhance the luminosity range of the image in windows which contain video beyond the luminosity range of areas outside the windows which contain text. The increase in the luminosity range makes the video richer in contrast, but, on a CRT, it also increases the spot-size, which would be undesirable for text areas. By increasing the range of luminosity only locally where a window with video is shown, video with a richer contrast can be combined with text.

However, it has been found that by extending the luminosity range, one increases the risk of doming (deformation of the shadow mask due to heating by the electron beam) and overloading of the high voltage (EHT) power supply.

SUMMARY OF THE INVENTION

Among others, it is an object of the invention to combine the display of high luminosity video, photographs or graphics with high resolution text on a CRT, without problems due to EHT overloading. A further object is to avoid problems due to doming in such a device.

The device according to the invention is characterized in that the drive means is arranged to change said relation between the information and the drive signal in the window so as to reduce the drive signal range when an average luminosity on the cathode ray tube exceeds a threshold value. By locally reducing the range of drive signal values in the windows where it has been enhanced in case the luminosity (i.e., beam energy) range becomes too high, overloading problems can be prevented.

A further embodiment of the device according to the invention is characterized in that said drive means is arranged to determine said average luminosity averaged over said window from the information received for said window, the drive means controlling said relation so that said average luminosity remains below the threshold value. By measuring the average luminosity in the window, or in each one of a number of separate windows where the drive signal range is increased, and reducing the drive signal range selectively if the average luminosity is too high, local doming effects are prevented. At the same time, text windows retain their original drive signal range and, therefore, they retain the same level of readability.

In an embodiment of the device according to the invention, the drive signal range is adjusted by varying an amplification gain of an amplification circuit for the image signal (e.g., for each of the R, G and B components). This can be readily implemented by inserting an amplifier with adjustable gain in the video signal path of known monitors, or using gain control inputs of available video amplifier IC's. In another embodiment, the window or several windows are identified by coordinates of corner points of the window(s) and/or values of the width and height of the window. Thus, the further information can be received with very little bandwidth using existing bus protocols, e.g., between monitors and PC's.

In a further embodiment of the device according to the invention, the average luminosity in a window is averaged over time, and the average over time is used to control the drive signal range for the window. By averaging the average luminosity over time, sudden artificial changes in visible luminosity due to the invention are prevented. Doming effects occur only with a long time constant of typically several minutes. Short excesses in the luminosity can be tolerated without visible effect. As a result, the time range over which the average is taken may be typically one minute or more. This also means that the circuit which selects the drive signal range may be relatively slow.

In another embodiment of the device according to the invention, the window is selected on the basis of a spatial frequency content of the image in the window. This makes it possible to discriminate between text and video, photo or graphics information.

BRIEF DESCRIPTION OF THE DRAWING

These and other advantageous aspects of the invention will be described using the attached drawing, in which.

DESCRIPTION OF THE PREFERRED EMBODIMENTS

Figure 1:
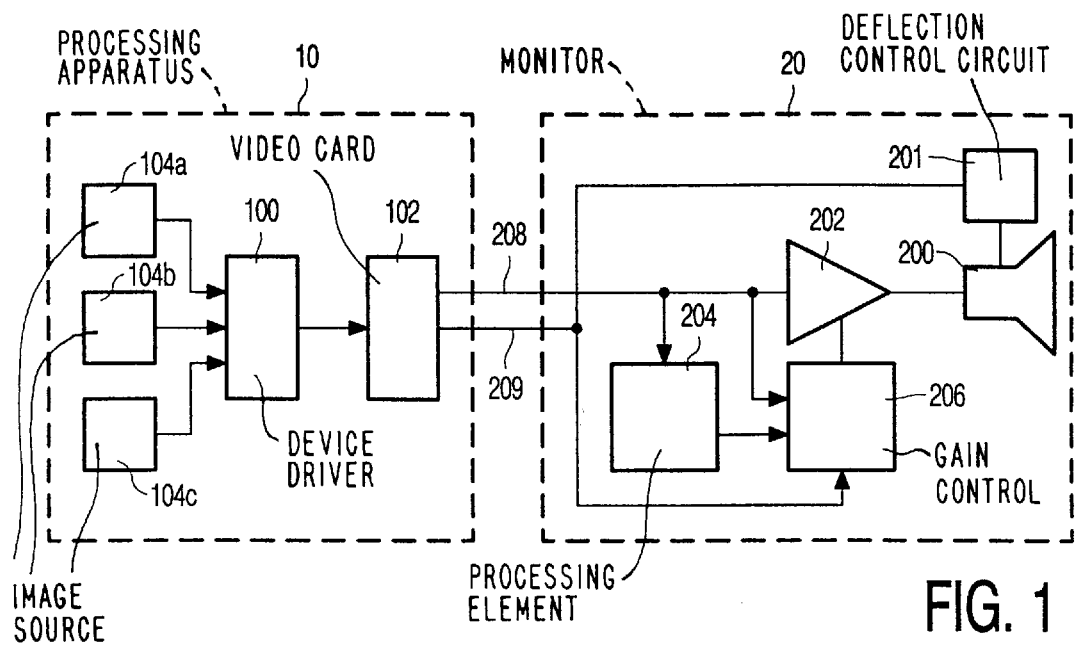
FIG. 1 shows an image display system according to the invention.

FIG. 1 shows an image display system. The system contains a processing apparatus 10 (which is, for example, a PC) and a monitor 20. The processing apparatus 10 contains several image sources 104a–104c connected to a device driver 100. Although the image sources 104a–104c and the device driver 100 are shown as individual units, they may actually be implemented as programs stored in the processing apparatus 10 and executed by a processing unit (not shown) of the processing apparatus 10. The device driver 100 has an output connected to a video card 102. The video card 102 is connected to an RGB output and a sync output of the processing apparatus 10.

The monitor 20 has an RGB input 208 and a sync input 209. The monitor 20 contains a video amplification circuit 202 which is coupled to the RGB input 208. An output of the video amplification circuit 202 is coupled to a CRT (Cathode Ray Tube) 200. The monitor contains a deflection control circuit 201 having an input coupled to the sync input 209 and an output coupled to the CRT 200.

The monitor 20 also contains a processing element 204 and a gain control unit 206. The RGB input 208 is coupled to the processing element 204 and the gain control unit 206, which is also connected to the sync input 209. An output of the processing element 204 is coupled to the gain control unit 206 and an output of the gain control unit 206 is connected to a gain control input of the amplification circuit 202. Of course, instead of an RGB representation of the image, other representations of the image may be used, for example, like YUV representation, but, for the sake of clarity, the invention will be explained using RGB signals.

In operation the image display system will cause the display of an image on the CRT 200.

Figure 2:
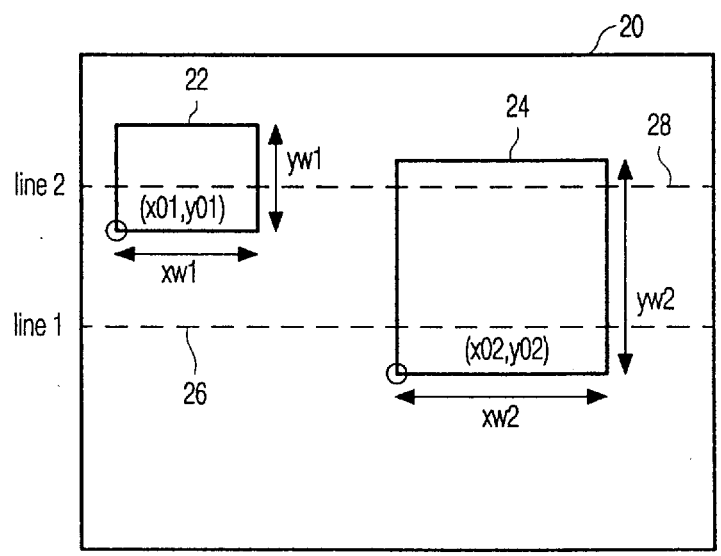
FIG. 2 shows an image containing several windows.

FIG. 2 shows an example of a displayed image 20. The image contains two rectangular windows 22, 24. Different window sources 104a–104c may produce image information that defines the image inside respective windows 22, 24, but it is also possible that an image source 104a–104c define the image inside more than one window, or in one or more sub-windows contained in a window.

The image sources 104a–c supply the image information to the device driver 100, which converts the image information into a form that is adapted to control the video card 102. The video card 102 processes the information to form an RGB signal and horizontal and vertical sync signals to control the operation of the CRT 200. The RGB signals are supplied to the amplification circuit 202, which amplifies each of the R (Red), G (Green) and B (Blue) signals and supplies the amplified signals to the CRT 200. The deflection control circuit 201 processes the sync signals and supplies deflection signals to the CRT to ensure that the RGB information is written at the right location on the screen of the CRT 200.

In some of the windows 22, 24 the image is shown on the CRT 200 with a greater luminosity range than in other windows. This is used, for example, for windows in which video information or (photo)graphic information is displayed. On the other hand, in other windows, for example windows where letters are displayed, the luminosity range is not extended. Increasing the luminosity range so that a higher luminosity can be produced increases the CRT beam spot size, so that the maximum possible resolution is decreased. By increasing the luminosity range in certain windows and not in others, the other windows (e.g., text windows) retain high resolution but, at the same time, the perceptual quality of video/(photo)graphic information is improved by the greater luminosity range.

The video card 102 sends a signal which identifies the windows in which the luminosity range should be greater, for example, in the form of coordinates (x0,y0) of the lower left corner, and width and height values (xw,yw) of the window. This signal is sent, for example, in an otherwise unused video line, or using a separate bus, using, for example, one of the known MVL (Moving Video Labs), USB or DDC2B+ protocols. The processing element 204 in the monitor 20 receives this signal, decodes it and sends information to the gain control unit 206 to identify these windows, for example in the form of coordinates (x0,y0) of the lower left corner, and width and height values (xw,yw) of the window.

The gain control unit 206 processes the sync signals and determines when RGB values concerning pixels inside identified windows are transmitted. When this is the case, the gain control unit 206 supplies a signal to the amplification circuit 202 to increase the amplification gain.

Figure 3:
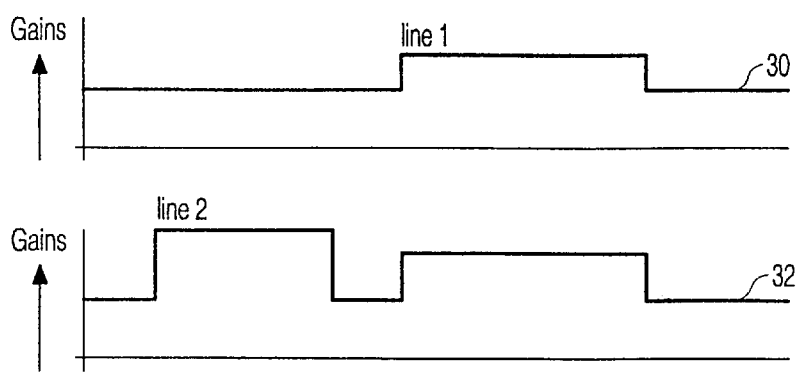
FIG. 3 shows a graph of amplification gains of the amplifier in the image display system.

FIG. 3 illustrates the increased gain for two raster lines 26, 28 shown in FIG. 2. A first trace 30 shows an amplification gain along a first raster line 26 which crosses a first window 24 for which information is transmitted indicating that it should have higher gain. Outside the windows, the gain has a lower value. Similarly, a second trace 32 shows an amplification gain along a second line, which crosses two such windows 22, 24.

Preferably a monitor 20 is used that is capable of displaying an image in which each pixel has maximum luminosity in case the amplification gain is not increased anywhere. In such a monitor 20, the high voltage (EHT) does not drop below a minimum acceptable level in this case and no unacceptable doming effect will occur due to heating of the CRT 200.

With such a monitor, the increased amplification gain in some windows may cause EHT or doming problems because too much power is used in the CRT. Often, the increased amplification gain will not lead to any problems with the EHT or doming because the average luminosity level inside a window is usually much less than the maximum possible luminosity value. For example, in a video/photographic window, the average luminosity is typically one third of the maximum possible luminosity. So if the amplification gain is increased by a factor three or less no problems will occur on average.

However, without further measures, these problems are avoided only on average. When the image has a near maximum luminosity over most of a window in which the amplification gain is increased, local doming may still occur and the EHT supply may fall too low.

To prevent such problems, the gain control unit 206 preferably computes, for each window in which the amplification gain is increased, a respective sum of the luminosity values defined by the RGB values. Such a sum is indicative of the per pixel average luminosity in the corresponding window and if the sum is too high, problems may be expected if the amplification is applied to that window. To prevent such problems, the gain control unit 206 compares the average for each window with a threshold value and if the average exceeds the threshold, the gain control unit 206 reduces the amplification gain for the corresponding window, so that the average luminosity in the window on the screen of the CRT does not cause doming problems. To illustrate this, in the second trace 32, the first window 24 is seen to have a lower increased gain than the second window 22, because the average luminosity in the first window 24 has a higher average luminosity.

For example, suppose the monitor 20 is capable of handling an average luminosity LM without problems. (LM is typically the luminosity which occurs when maximum RGB values are used without increased amplification gain). If the average luminosity of the RGB values in a window is A and the increased amplification gain is G then G*A should be less than LA and if A is greater than LM/G, then the gain control unit 206 will reduce G to LM/A at the highest.

The size of doming effects depends on the location on the screen. For example, for most CRT's doming effects are smaller close to the edges of the screen. Therefore, one may select the maximum luminosity LM as a function of the position of the window, or the positions covered by the window, dependent on the size of the acceptable doming effect for that position or those positions.

If the contents of the window change as a function of time, the average A is preferably computed as a temporal average averaged over a certain amount of time, typically one or more minutes, for typical CRT's 200 in which doming effects occur in a time-scale of one or more minutes. This avoids visible sudden changes in gain and prevents unnecessary changes if the average luminosity in the window is temporarily too high. Temporary excess luminosity is no problem because it takes a certain amount of time before a high luminosity leads to doming problems.

Thus, the areas of the image where the gain is not increased (e.g., areas with text containing letters) retain the same luminosity and remain readable, but an enhanced windows is made less luminous in its entirety, i.e., without artificial local gain variations inside that window.

The temporal average may be determined, for example, by averaging the average computed for one window in one video frame over one or more minutes or by low-pass filtering the average computed for one window in one video frame with a filter that has a bandwidth of one inverse minute or less.

Of course, the gain control unit 206 may implement the prevention of doming in one of several ways. For example, instead of adjusting the amplification gain continuously or in small steps, the gain control unit may simply switch-back the amplification gain for a window to the normal amplification gain in one step if the average luminosity is too high. This results in a very simple digital control.

For the prevention of problems with the high voltage supply (EHT), it is not necessary to average the luminosity of the windows separately. Instead, one may average the luminosity of the entire image with increased gain in individual windows, to determine 20 whether the average luminosity in the image is too high. If so, the gain can be reduced for individual windows in which the gain was increased. To prevent EHT problems, time-averaging of the average luminosity is performed in a time-scale that is typical for the response time of the EHT supply, typically, in the order of seconds.

The gain control unit 206 may combine two control mechanisms, one for preventing problems with the EHT supply which controls the average luminosity over the entire image, and one for preventing problems with doming which controls the averages for individual windows.

The windows in which the amplification gain is increased can be selected at will. In one version, this is done by the image sources 104a–104c, for example, by application software in a PC. One such image source 104a–104c is, for example, a WEB browser which shows a WEB page containing text and sub-windows with photos or video. In this case, the browser may indicate one or more of the sub-windows with photos or video in order to increase the amplification gain.

Alternatively, the device driver 100 may select windows in which the gain must be increased. This can be done, for example, by determining the high spatial frequency energy-content in a window that would be lost by increasing the gain due to increased spot size in the CRT, and comparing it with the low spatial frequency energy-content (excepting zero-spatial frequency).

Only if the high frequency content is sufficiently small relative to the low frequency content, the image may be taken to be a photo, video or graphics instead of text and the increased amplification may be switched on. Preferably, the device driver switches on increased amplification only for windows that are larger than a certain size. This reduces the number of windows for which averages must be computed and prevents increased gain for secondary information such as logo's.

In this way, image sources 104a–c can be used that are independent of the possibility to increase the gain in selected windows.

The shape of the windows is not necessarily rectangular. However, for rectangular windows, the position and size of the windows can be easily communicated in the form of coordinate values of corners and/or height width values. For most other window shapes, more parameters need to be communicated, or a signal can be supplied for each pixel to identify the window to which the pixel belongs.

Preferably, gain control is implemented in the monitor 20, as shown. However, it is also possible to implement it in the processing apparatus 10, e.g., in the device driver 100. In this case, a conventional monitor 20 is preferably augmented with a switch, to increase the gain of the RGB amplifiers. This switch is operable by the processing apparatus, for example using the MVL protocol.

In this version, the processing apparatus 10 decides whether increased gain is needed and if so the processing apparatus causes RGB amplifiers in the monitor 20 to switch to high gain for the entire image. The processing apparatus then reduces the RGB output strength correspondingly everywhere except in the windows where higher gain is desired. When the average luminosity in such a window is too high, the RGB output is reduced for such a window too.

Thus the same effect can be achieved as with the gain control unit 206, except that at least one bit of RGB quantization resolution is lost.

What is claimed is:

1. An image display device comprising:
   an input for receiving information representing an image;
   drive means for generating a drive signal from the information;
   a cathode ray tube for displaying the image based on the drive signal, said cathode ray tube being driven by the drive signal; and
   input means coupled to the drive means for receiving further information identifying a window of pixels in the image, wherein the drive means changes a relation between the information and the drive signal in the window as compared to a further relation between the information and the drive signal in areas outside the window, so as to enhance a drive signal range in the window,
   characterized in that the drive means determines the average luminosity on the cathode ray tube, and further changes said relation between the information and the drive signal in the window so as to reduce the enhanced drive signal range when said average luminosity exceeds a threshold value.

2. The image display device as claimed in claim 1, wherein the drive means determines said average luminosity by averaging the luminosity of the information received for said window, the drive means controlling said relation so that said average luminosity remains below the threshold value.

3. The image display device as claimed in claim 1, wherein the drive means comprises an amplification circuit, the drive means changing said relation by adjusting an amplification gain of the amplification circuit.

4. The image display device as claimed in claim 1, wherein the further information comprises coordinate values of the window, the drive means determining the window in which the drive means changes said relation from said coordinate values.

5. The image display device as claimed in claim 2, wherein said drive means determines said average luminosity by averaging the luminosity of the information received for said window over time.

6. The image display device as claimed in claim 1, wherein said drive means selects said window by determining a high spatial frequency content of the image in said window, which would be suppressed by enhancing the drive signal range due to increase in a spot size of the cathode ray tube, and selecting said window only if said high spatial frequency content is below a threshold.

7. The image display device as claimed in claim 1, wherein said window is selected only if said window has more than a predetermined size.

8. An image display device comprising:

an input for receiving information representing an image;

an amplification circuit for generating a drive signal from the information;

a cathode ray tube for displaying the image based on the drive signal, said cathode ray tube being driven by the drive signal; and drive means having an input for receiving further information identifying a window of pixels in the image, the drive means increasing an amplification gain of the amplification circuit for a part of the image in the window, characterized in that said drive means determines an average luminosity on the cathode ray tube, and reduces the increased amplification gain of the amplification circuit when the average luminosity exceeds a threshold level.

9. An image display device comprising:

an input for receiving information representing an image;

drive means for generating a drive signal from the information;

a cathode ray tube for displaying the image based on the drive signal, said cathode ray tube being driven by the drive signal; and input means coupled to the drive means for receiving coordinates of a window of pixels in the image, wherein the drive means changes a relation between the information and the drive signal in the window as compared with a further relation between the information and the drive signal in areas outside the window, so as to enhance a drive signal range in the window, characterized in that said drive means determines an average luminosity on the cathode ray tube, and further changes said relation between the information and the drive signal in the window so as to reduce the enhanced drive signal range when said average luminosity exceeds a threshold value.

* * * * *